United States Patent

Forestiero et al.

[11] Patent Number: 5,902,065
[45] Date of Patent: May 11, 1999

[54] BEARING UNIT WITH A QUICK MOUNTING ROTATIONAL SPEED DETECTOR

[75] Inventors: Paolo Forestiero, Airasca, Italy; Christian Rigaux, Acheres, France

[73] Assignee: SKF Industries S.p.A., Turin, Italy

[21] Appl. No.: 08/723,088

[22] Filed: Oct. 1, 1996

[30] Foreign Application Priority Data

Oct. 5, 1995 [IT] Italy ................ TO950216 U

[51] Int. Cl.⁶ .................. G01P 1/00; G01P 3/44
[52] U.S. Cl. ............. 403/327; 403/326; 384/448; 439/850
[58] Field of Search .................. 403/327, 326, 403/329; 439/849, 850; 384/446, 448; 188/181 R; 324/174, 173

[56] References Cited

U.S. PATENT DOCUMENTS

| | | | |
|---|---|---|---|
| 1,572,003 | 2/1926 | Fleming | 403/329 X |
| 1,699,276 | 1/1929 | Boye | 403/326 |
| 1,958,613 | 5/1934 | Driskell | 403/329 X |
| 3,139,318 | 6/1964 | Binder et al. | 439/850 |
| 3,866,868 | 2/1975 | Fish et al. | 403/329 X |
| 4,037,690 | 7/1977 | Fisher et al. | 188/181 R |
| 4,946,295 | 8/1990 | Hajzler | 384/448 |
| 5,103,170 | 4/1992 | Grillo et al. | 324/173 |
| 5,104,253 | 4/1992 | Zielinski et al. | 403/329 |
| 5,296,805 | 3/1994 | Clark et al. | 324/174 |
| 5,451,869 | 9/1995 | Alff | 324/173 |
| 5,611,545 | 3/1997 | Nicot | 384/448 X |
| 5,640,087 | 6/1997 | Alff | 324/173 |
| 5,642,042 | 6/1997 | Goossens et al. | 324/173 |

FOREIGN PATENT DOCUMENTS

| | | |
|---|---|---|
| 743 526 | 11/1996 | European Pat. Off. . |
| WO 93/13424 | 7/1993 | WIPO . |

Primary Examiner—Anthony Knight
Attorney, Agent, or Firm—Merchant, Gould, Smith, Edell, Welter & Schmidt P.A.

[57] ABSTRACT

In a device for gauging relative rotational speed between the races of a bearing unit, a sensor is mounted to a fixed part and faces a rotating impulse ring. The sensor is incorporated within a detachable head (12) having releasable quick coupling means (13, 20), such as a clip, for mounting to a corresponding quick coupling seat (14), such as an appendix, rigid with the non-rotating race (15) of the bearing assembly. The appendix (14) is oriented in an axial or slightly inclined direction with respect to the axis of rotation. Mounting and removal of the head (12) is accomplished with a simple movement in said direction.

4 Claims, 5 Drawing Sheets

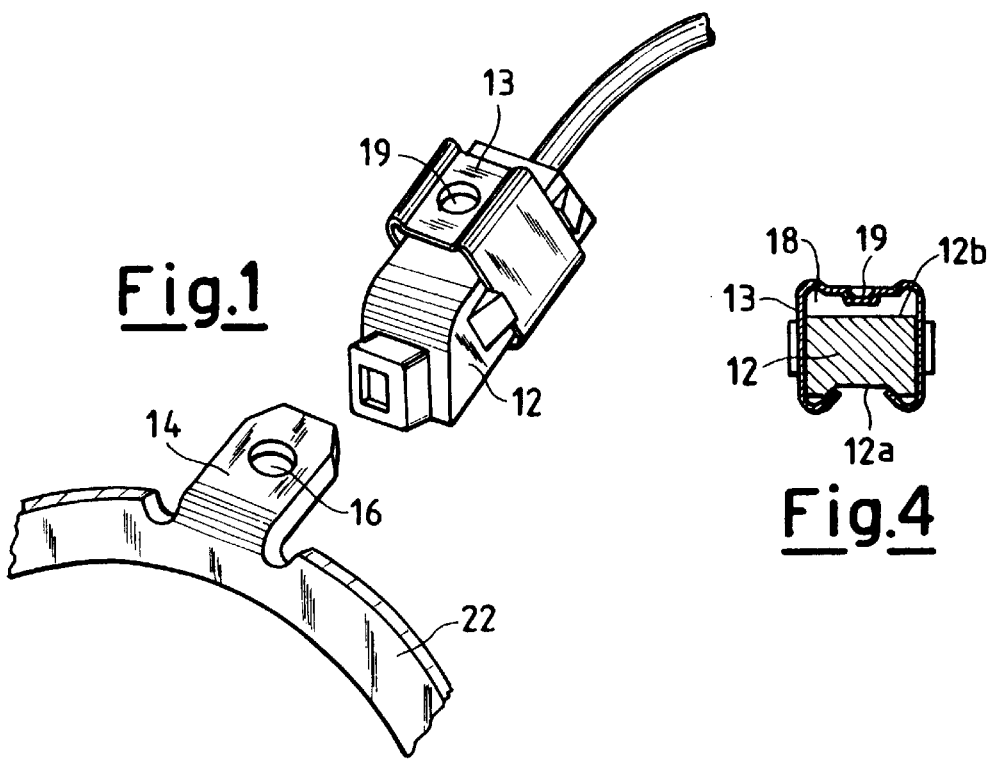
Fig.1
Fig.4
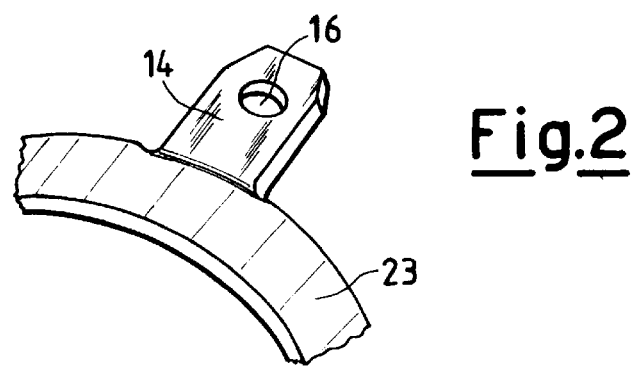
Fig.2
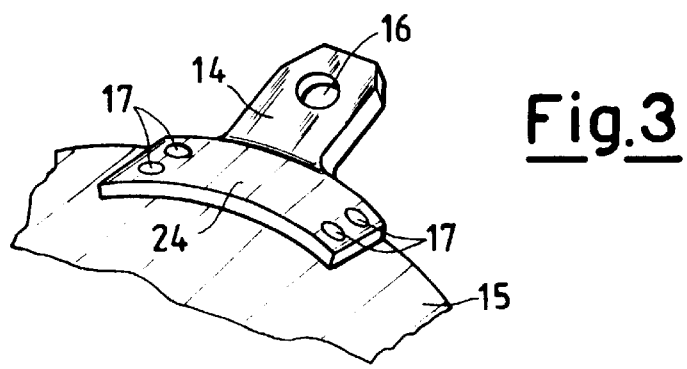
Fig.3

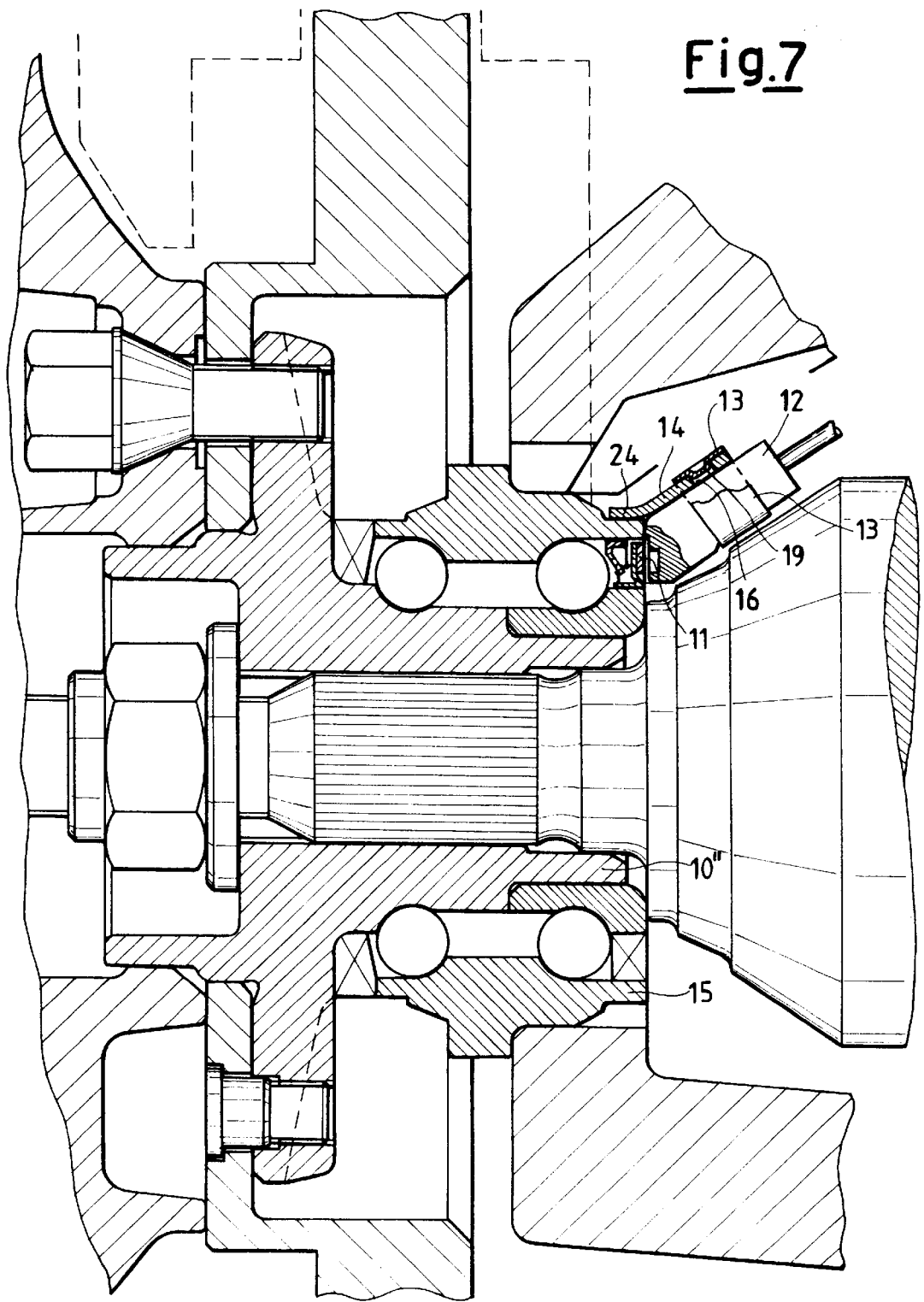

BEARING UNIT WITH A QUICK MOUNTING ROTATIONAL SPEED DETECTOR

The present invention falls within the field of devices for gauging relative rotational speed between two relatively rotating members. More particularly, the invention related to a device for gauging relative rotational speed between the races of a bearing unit, the device having a quick coupling system.

Rotational speed gauging system of known kind are generally composed of an impulse ring, a sensor, an on-board processing unit and a shunt connection unit.

The impulse ring is usually a magnetized or toothed ring mounted to the rotating part to be kept under control. The sensor is installed on a fixed part of the chassis facing the impulse ring at a predetermined distance. Signals generated by the sensor are transmitted to the on-board processing unit. With anti-slide devices, the processing unit detects the difference of speed between the vehicle wheels.

Conventional systems of mounting the sensor to a fixed supporting member generally make use of a threaded fastening means, such as a screw, which is fastened into a threaded hole that has to be especially obtained in the body of the supporting member. This represents a drawback. For on-vehicle applications, the member supporting the bearing is the knuckle or suspension standard. However, the mounting of the sensor implies a constructional complication which it is desired to avoid. Further, the sensor is exposed to crashes and is adversely affected by vibration due to the fact that the impulse ring is mounted to the bearing while the sensor is fixed to the suspension standard.

It is an object of the present invention to provide a device capable of overcoming the above prior art drawbacks. Particularly, it is an object of the present invention to provide a device capable of rendering assembly and, optionally, replacement of the sensor easier and quicker.

In accordance with the invention as claimed, this object is accomplished by the provision of a device for gauging relative rotational speed between the races of a bearing unit, of the type comprising a sensor mounted to a fixed part and operationally facing a rotating impulse ring, characterized in that the sensor is incorporated within a detachable head having releasable quick coupling means for mounting to a corresponding quick coupling seat rigid with the non-rotating race of the bearing assembly, said coupling seat being oriented in a substantially axial or slightly inclined direction with respect to the axis of rotation, whereby mounting and removing the head is accomplished with a simple movement in said direction.

In order that the present invention may be well understood there will now be described a few preferred embodiments thereof, given by way of example, reference being made to the accompanying drawings, in which:

FIG. 1 is a perspective view of a quick coupling device according to the present invention;

FIGS. 2 and 3 are perspective views showing two variant embodiments of the quick coupling seat for a sensor carrier head;

FIG. 4 is a cross-sectional view of the sensor carrier head of FIG. 1;

FIGS. 5 to 7 are longitudinal axial cross-sectional views of a bearing on which there are mounted the systems of FIGS. 1 to 3, respectively.

Figure 5:
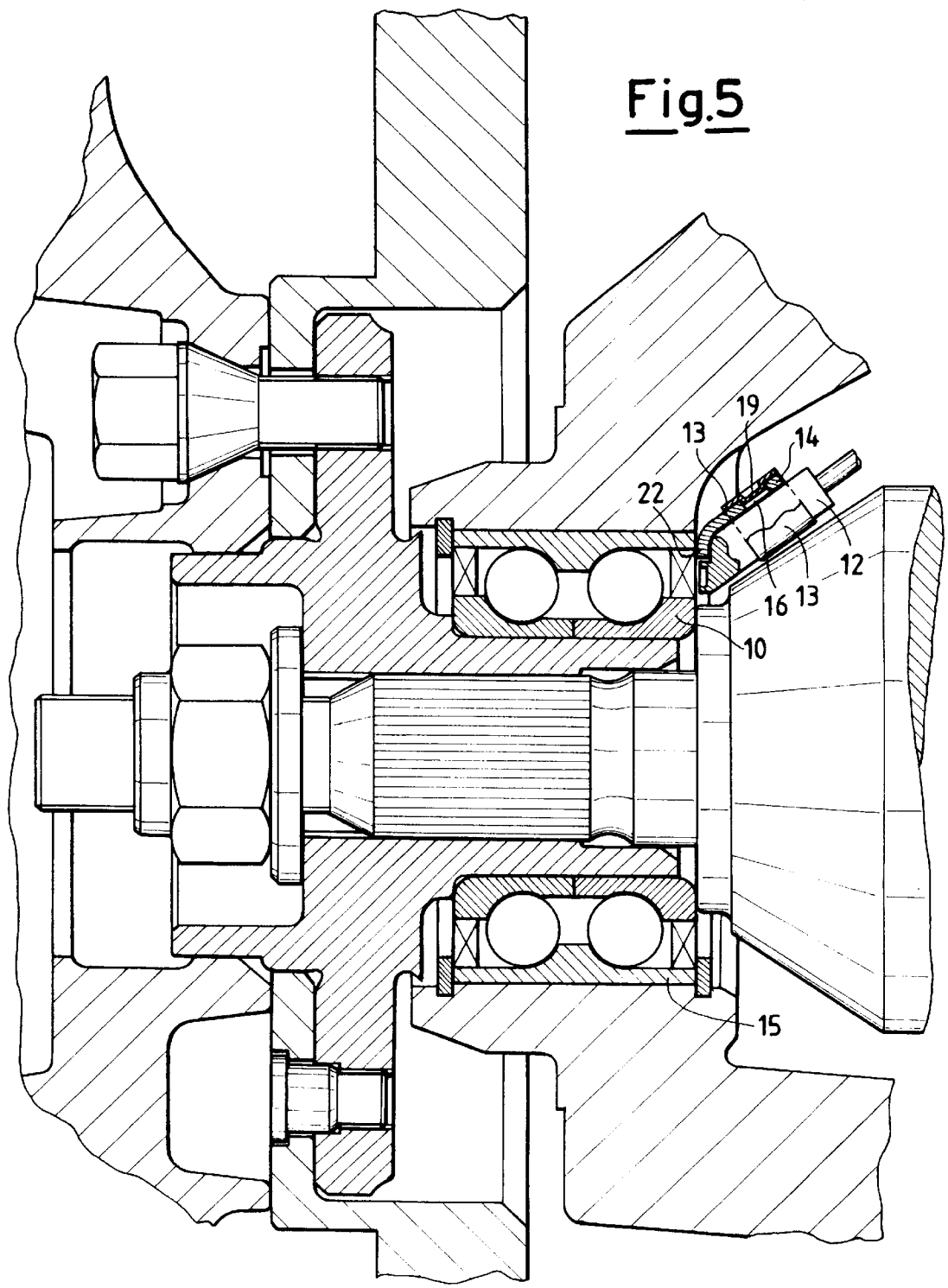
Figure 6:
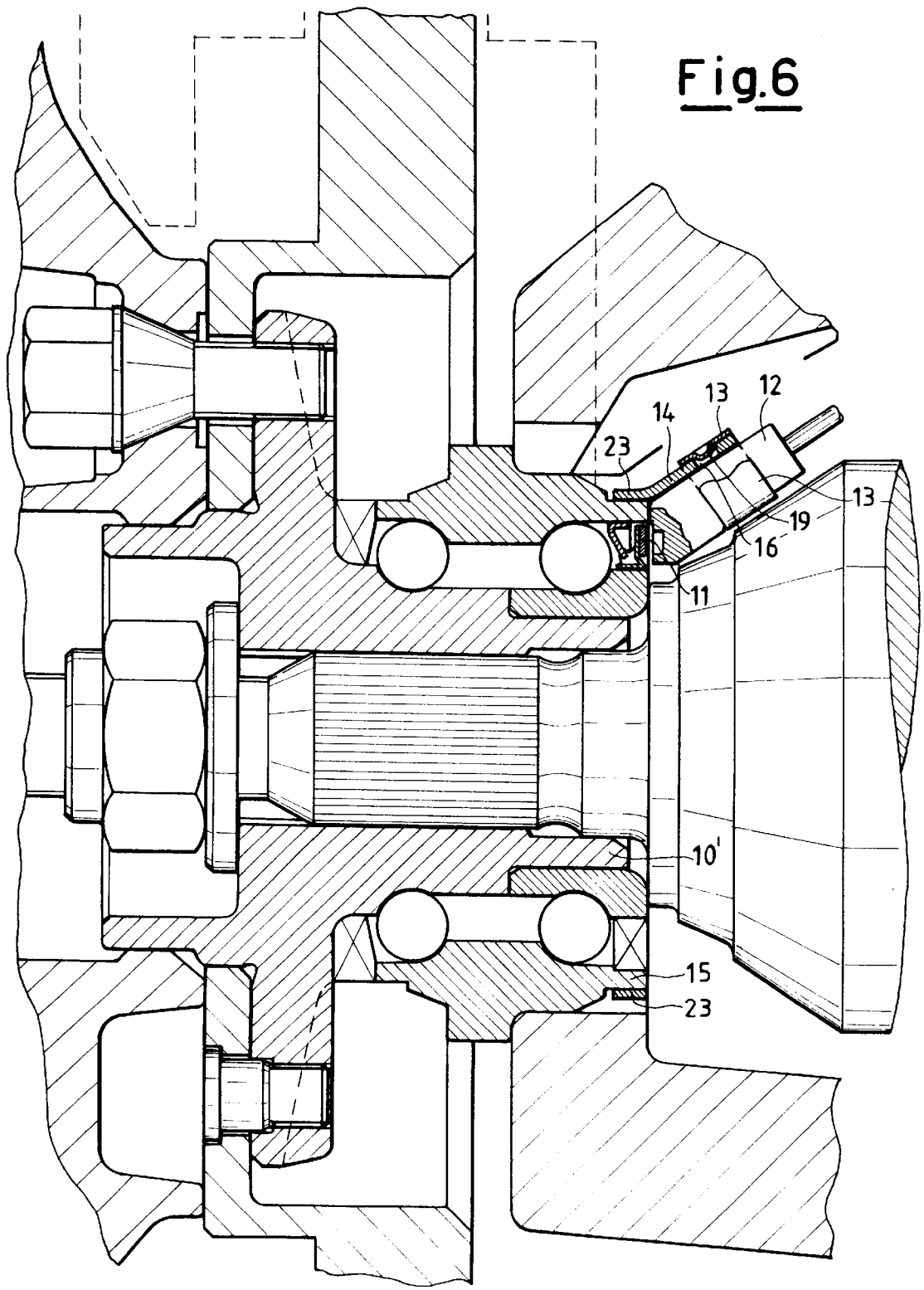

With reference initially to FIGS. 5 to 7, there are illustrated axial sectional views of rolling contact bearings, in particular for the wheel hub of a vehicle. The inner race 10, 10', 10" of the bearing is the rotating part, while the outer race 15 is stationary.

The revolving speed gauging device is essentially composed of a rotating impulse ring 11 and a gauging sensor (not shown) respectively fitted to the rotating inner race 10, 10', 10" and the stationary outer race 15. In normal operation conditions, the sensor is facing the impulse ring in the arrangement shown in FIGS. 5 to 7.

With reference to FIG. 1, a sensor (not shown) of conventional kind is incorporated in a sensor carrier head 12 provided with an elastic means 13 for quick coupling to a corresponding coupling seat 14 integral with the stationary race 15 of a rolling contact bearing (illustrated in cross section in FIG. 5). Coupling seat 14 is so arranged as to allow accurate coupling and uncoupling of head 12 in quick and easy manner. In carrying out this operation, the operator has simply to pull or push the head in a substantially axial direction, i.e. parallel to the axis of rotation of the bearing, according to whether the sensor is to be mounted or removed.

In the preferred illustrated embodiments, the coupling seat consists of an appendix 14 oriented in a direction which is substantially axial or slightly inclined relative to the axial direction. A recess 16, preferably in form of a hole is obtained in the appendix. The corners at the free end of the appendix are blunted to facilitate coupling to the head 12.

As shown in FIGS. 1 and 4, the elastic means 13 is preferably in form of a metal clip hooking two sides of the lower face 12a of head 12. The clip forms a seat 18 adapted to receive the appendix 14 above the upper face 12b. An elastic locking member 19 projects in seat 18 towards head 12. Elastic locking member 19 is adapted to snap-fit in the recess 16 of the appendix in such manner to releasably lock the sensor carrier head 12 in its normal operation position. The snap accurately defines the position of the sensor and its distance from the impulse ring.

Figure 9:
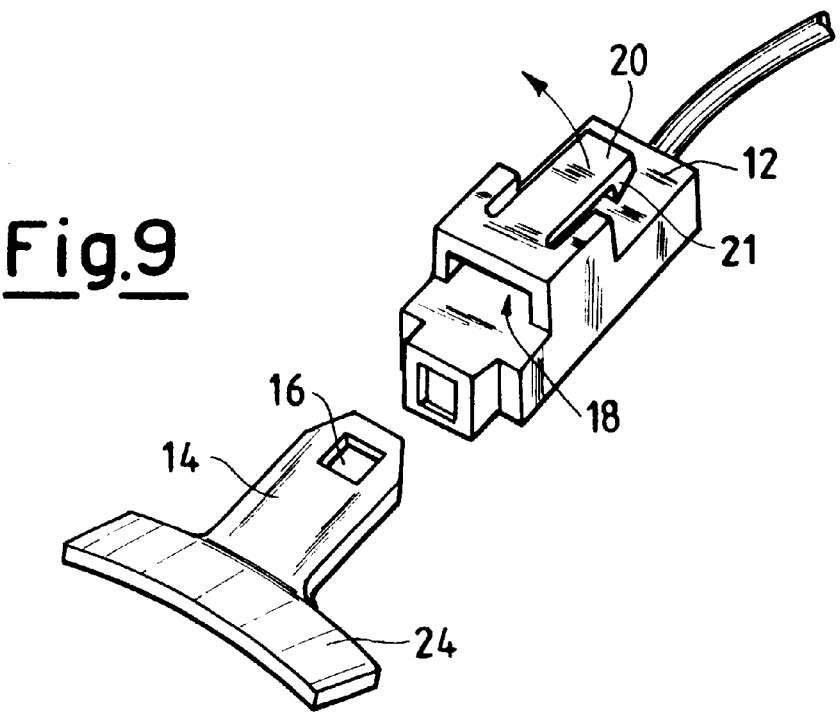
FIGS. 8 and 9 depict two further alternative embodiments of the sensor carrier head in accordance with the present invention.
Figure 8:
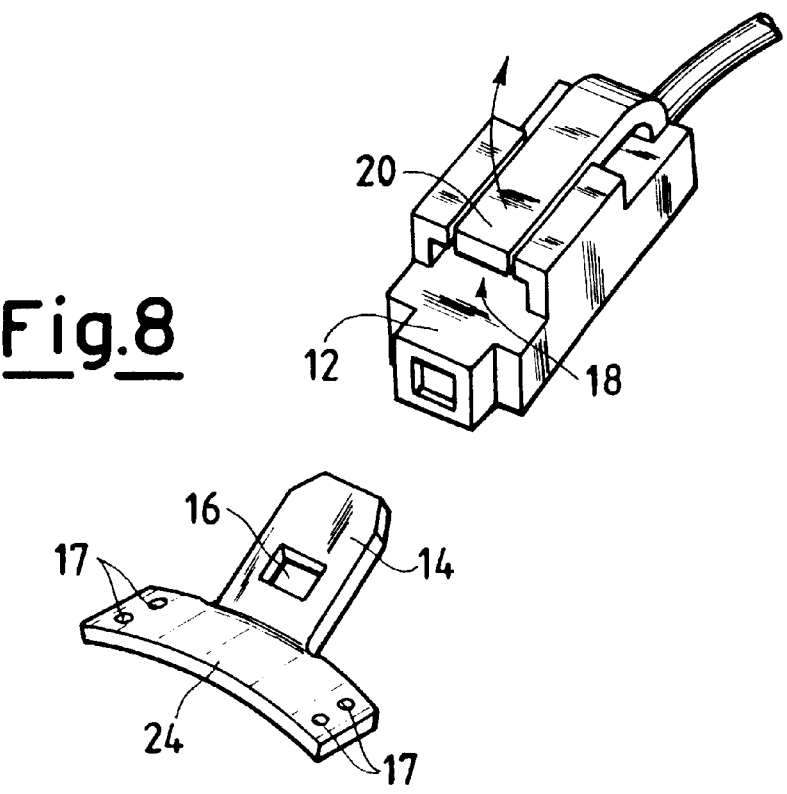

As will be apparent, although the elastic member has been shown in form of a metal clip, i.e. an element added to the head incorporating the sensor, a number of variant embodiment of this coupling system can be provided. For example, the elastic member can be made integral with the sensor carrier head, or the coupling seat can be made integral with the sensor carrier head and an elastic locking member fixed to the stationary supporting part. As shown in the examples of FIGS. 8 and 9, the elastic locking member is a plastic element incorporated in the sensor carrier head 12. Preferably, said locking member is obtained as a single piece with the same sensor carrier head, in form of an elastically pliable tongue 20 having a tooth 21 for engaging the recess 16.

Still with reference to FIG. 1, the appendix in this example is incorporated in an open metal ring 22 the radial dimension of which prevails on the axial dimension. Such open ring 22 is conventionally fitted on the stationary part supporting the bearing to prevent this from moving axially. In the particular application to an automobile, the open ring is usually snap-mounted to the suspension standard adjacent to the wheel hub bearing. The embodiment of FIG. 1, in which the open ring 22 is modified in accordance with the present invention to support the sensor, is therefor well suited for applications on bearings having no radial flanges.

Referring to the embodiment illustrated in FIG. 2, the coupling seat of the head 12 is obtained forming or welding the appendix 14 with a metal circular ring 23 adapted to be force-fitted to the non rotating race 15 of the bearing. Circular ring 23, the axial dimension of which is greater than the radial dimension, is well suited for application with bearings having radial flanges and not provided with open metal rings as set forth.

In FIG. 3 there is depicted a further variant embodiment of the present invention, wherein the sensor carrier head mounting appendix 14 has an arched base 24 spot welded at 17 to the outer non-rotating race of the bearing. Advantageously, the curvature of base 24 corresponds to that of the cylindrical surface to which it is welded.

While specific embodiments of the invention have been disclosed, it is to be understood that such disclosure has been merely for the purpose of illustration and that the invention is not to be limited in any manner thereby. Various modifications will be apparent to those skilled in the art in view of the foregoing example. The scope of the invention is to be limited only by the appended claims.

We claim:

1. A device for gauging relative rotational speed between a rotating race and a non-rotating race of a bearing unit, the device comprising:

a sensor mounted to a stationary part of the bearing unit;

a rotating impulse ring, the sensor operationally facing the rotating impulse ring;

a head having releasable quick coupling means for coupling in detachable manner to a quick coupling seat provided by an appendix fast with the non-rotating race of the bearing unit, the sensor being incorporated within the head, the appendix being oriented in a substantially axial direction with respect to an axis of rotation of the bearing unit; and wherein the appendix is integrally formed with a ring portion having a curved shape for fitting to a corresponding non-rotating surface fast with the stationary part of the bearing unit.

2. A device as claimed in claim 1, wherein the ring portion is an open ring for snap mounting onto a suspension standard supporting the bearing unit, the open ring having a radial dimension prevailing on an axial dimension of the bearing unit.

3. A device as claimed in claim 1, wherein the ring portion is closed ring having its axial dimension prevailing on a radial dimension of the bearing unit, the closed ring being adapted to be forcefully fitted to a surface of the non-rotating race of the bearing unit.

4. A device as claimed in claim 1, wherein the ring portion is an arched base adapted for welding to a surface of the non-rotating race of the bearing unit.

* * * * *

UNITED STATES PATENT AND TRADEMARK OFFICE
CERTIFICATE OF CORRECTION

PATENT NO. : 5,902,065

DATED : MAY 11, 1999

INVENTOR(S) : FORESTIERO ET AL.

It is certified that error appears in the above-identified patent and that said Letters Patent is hereby corrected as shown below:

Title page, [73] Assignee: "Turin" should read --Torino--

Signed and Sealed this

Thirtieth Day of May, 2000

Attest:

Q. TODD DICKINSON

*Attesting Officer*  *Director of Patents and Trademarks*

UNITED STATES PATENT AND TRADEMARK OFFICE
CERTIFICATE OF CORRECTION

PATENT NO. : 5,902,065  Page 1 of 1
DATED : May 11, 1999
INVENTOR(S) : Forestiero et al.

It is certified that error appears in the above-identified patent and that said Letters Patent is hereby corrected as shown below:

<u>Title page,</u>
Item [73], Assignee: "Industries" should read -- INDUSTRIE --; "Turin" should read -- Torino --
Item [30], Foreign Application Priority Data: "TO950216 U" should read -- TO95U000216 --

Signed and Sealed this

Thirtieth Day of July, 2002

*Attest:*

JAMES E. ROGAN
*Attesting Officer*   *Director of the United States Patent and Trademark Office*